July 21, 1925.
J. J. ZELLER ET AL
1,546,426
VEHICLE TIRE
Filed Jan. 22, 1923
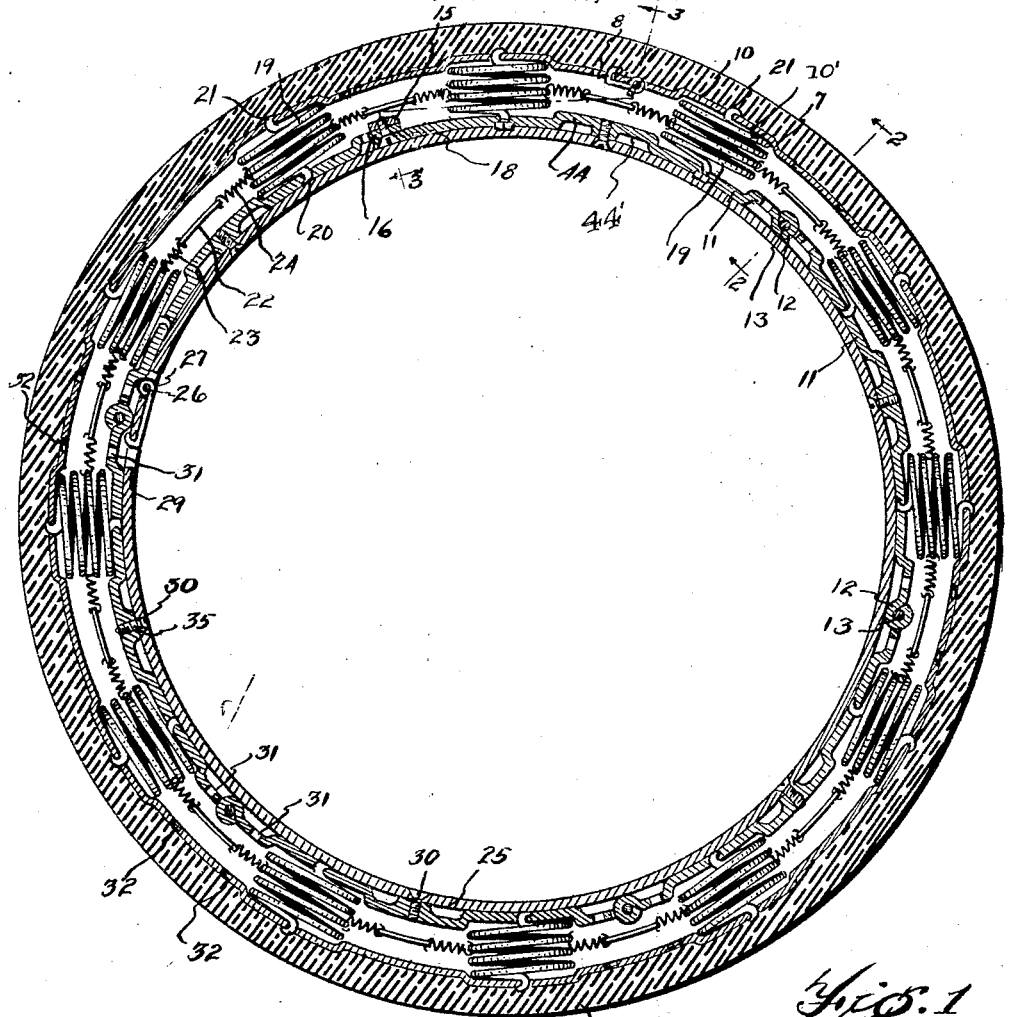
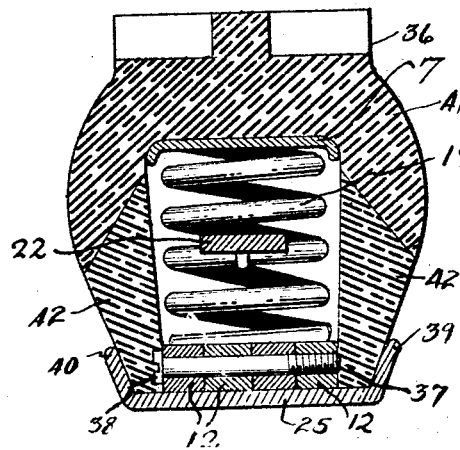
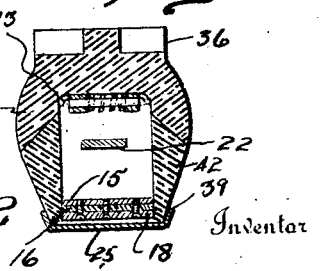
Inventor
John J. Zeller
John J. Zeller, Jr.
Thos. L. Donnelly
Attorney Patented July 21, 1925.

1,546,426

UNITED STATES PATENT OFFICE.

JOHN J. ZELLER AND JOHN J. ZELLER, JR., OF ONAWAY, MICHIGAN.

VEHICLE TIRE.

Application filed January 22, 1923. Serial No. 614,135.

*To all whom it may concern:*

Be it known that we, JOHN J. ZELLER and JOHN J. ZELLER, Jr., each a citizen of the United States, and each residing at Onaway, in the county of Presque Isle, in the State of Michigan, have invented a certain new and useful Improvement in a Vehicle Tire, of which the following is a specification.

Our invention relates to a new and useful improvement in a vehicle tire and has for its object the provision of means in a vehicle tire for rendering the same puncture proof and at the same time retaining for it the resiliency which is ordinarily possessed by the conventional types of pneumatic tires.

Another object of the invention is the provision in a vehicle tire of a pair of puncture proof annular members spaced apart, and having a rubber covering thereon and means positioned between said members for retaining the same normally spaced apart.

Another object of the invention is the provision in a vehicle tire of a puncture proof member cooperating with a metallic annular member and provided with means between said members for absorbing the shock transmitted to the wheel in its travel.

Another object of the invention is the provision in a vehicle tire of a sectional metallic annular member provided with cooperating means spaced apart therefrom for maintaining an outer covering of rubber normally in circular arrangement.

Another object of the invention is the provision of a pair of annular metallic members provided with means for maintaining the same in spaced relation and for allowing the approach of said members toward each other.

Another object of the invention is the provision of metallic members spaced apart and provided with means for securing the same to the rim of the vehicle.

Another object of the invention is the provision of a pair of metallic members spaced apart and provided with means for maintaining the same in spaced relation and for locking the same in assembled relation to permit the removal of said maintaining members separately.

Other objects will appear hereinafter.

The invention consists in the combinations and arrangements of parts hereinafter described and claimed.

The invention will be best understood from a reference to the accompanying drawings which form a part of this specification and in which, Fig. 1 is a central, longitudinal sectional view of the invention, Fig. 2 is a sectional view taken on line 2—2 of Fig. 1, and Fig. 3 is a sectional view taken on substantially line 3—3 of Fig. 1, the clasp omitted.

The invention is intended to provide a vehicle tire which will be resilient to substantially the same degree as the pneumatic tire and which will be free from any of the annoyance which results from punctures with the pneumatic tire. To accomplish this we provide an annular member 7 having ends formed from a split in the member, one of the ends being provided with a slot or eye into which the tongue of a clasp 8, which is pivotally mounted on the member 7, is adapted to project, said tongue being held normally in engagement with the eye edge by means of a spring 43. Provided on the periphery of the member 7 are bosses 10 which are formed by forming depressions 10' in the inner surface of the member 7, thus forming corresponding pockets in the member 7. A sectional annular member 11 is positioned within the member 7, the member 11 being of smaller diameter than the member 7 and spaced apart therefrom. The various sections are joined together at their adjacent ends by means of knuckles 12 and pintles 13, the knuckles being formed integral with the ends, the ends being provided with tongues which are curled upon themselves. Mounted upon one of the ends 16 of one of the sections is a reenforcing plate 15 which is fastened to an end 18 of one of the sections by means of screws or other suitable means, the adjacent end of the adjacent section being interpositioned between the plate 15 and the end 18. Secured at one end to the member 7 and at the opposite end to the member 11 at intervals are springs 19, the ends 20 and 21 thereof being projected through the respective members and clinched so as to present little obstruction on the periphery of the member to which attached. The pocket formed in the outer member serves to receive the spring when compressed and there is provided in the member 11 pockets 44' formed by pressing bosses 44 thereon. The springs 19 are connected adjacent their centers to each adjacent spring by means of a plate 22 to which is connected a spiral spring 23 which is fastened at one end to the spring 19. Another spiral spring 24 is connected to the opposite end of the plate 22 and to the adjacent spring 19. These connections serve to maintain the proper distance between the springs 19 at all times.

A metallic rim 25 is provided which is open and the ends thereof adapted to be secured together by means of a hook 27 which is pivotally mounted by means of a pintle 26 to knuckles formed from the member 25 and adapted to engage in a slot 29 formed in the opposite end of the member 25, the hook 27 being maintained in operative position by means of a spring as already described relative to the hook 8. The hook 26 may be readily engaged with the slot 29 of member 25 by first contracting the ends of the latter. Screws or bolts 30 serve to bind the rim 25 to the annular member 11, said screws being shown as threaded into openings formed in the member 11.

Each of the sections of the member 11 is provided with openings 31, registering with which are openings 32 formed in the member 7 and having the inner surface thereof threaded. When it is desired for any reason, such as the breaking of one of the springs 19, to remove one of the sections it is not necessary to disassemble the whole tire. Bolts may be projected through the openings 31 and threaded into the openings 32. The section that it is desired to remove may then be taken out and replaced without completely disassembling the entire tire. In this connection it should be noted that the pintles which pass through the knuckles of the adjoining ends of the sections are threaded at one end, the end knuckle being interiorally threaded to receive the same. Formed on the boss 44 of the member 11 is a boss 35 to afford a deeper thread for the screws 30.

The springs 19 which are positioned at opposite sides of the split in the annular member 7 have one end 21 projected through and clenched on the member 7, but the opposite end is projected through an opening formed in the member 11 and is threaded to receive a suitable nut. This affords a means for permitting the swinging out of place of the one section of the member 11 when it is desired to disengage the ends of the member 7.

A rubber covering 36 is provided which is positioned on the members 7 and 11 so as to practically surround the same, embracing them on three sides. The edges 37 and 38 engage between the flanges 39 and 40 which project outwardly from the edges of the rim member 25. The upper portion of the rubber covering is formed from a hardened rubber so that the portion 41 which is subjected to the greater wear will present a better wearing surface, while the inner portion 42 is formed from a soft rubber to allow for the deformation of the tire as the springs 19 are compressed.

A vehicle tire formed in this manner is adapted to permit of substantially the same easy riding as the pneumatic tire and the possibility of a puncture is entirely eliminated. In construction the annular members are made of metal, preferably some spring material and as the weight of the vehicle is placed upon the tire at different points in its revolution the springs will be compressed and the shock thus absorbed.

While we have illustrated and described the preferred form of structure we do not wish to limit ourselves to the precise form of structure shown but desire to avail ourselves of such variations and modifications as come within the scope of the appended claims.

Having thus described our invention what we claim as new and desire to secure by Letters Patent is:

1. A vehicle tire comprising an outer annular metallic member; an inner metallic annular member comprising a plurality of sections; means for connecting adjacent ends of said sections pivotally of each other; and a plurality of resilient members engaging each of said sections and said outer annular member for maintaining the same in spaced relation, the ends of said resilient members being projected through said metallic annular members.

2. A vehicle tire comprising an outer metallic annular member; a plurality of bosses formed on said member, peripherally thereof, to provide pockets on the inner surface thereof; an inner annular sectional metallic member having a plurality of bosses formed thereon peripherally thereof and arranged in staggered relation to the bosses on said outer annular member; and resilient means positioned between said members and adapted normally to maintain the same in spaced relation, the outer ends of said resilient means engaging in the pockets formed in said outer member.

3. A vehicle tire comprising an outer annular metallic member having a plurality of pockets formed in the inner surface thereof, said pockets being formed by off-setting the periphery of said member; a sectional inner annular metallic member having a plurality of off-set peripheral portions; a boss formed on each of said off-set portions to provide greater body thereto; and means for maintaining said members in spaced relation.

4. A vehicle tire comprising an outer annular metallic member; projections formed on the periphery thereof, to provide pockets on the inner surface thereof; a sectional annular metallic member positioned within said outer member and spaced therefrom; springs for maintaining said members normally in spaced relation, the ends of said springs being projected through openings formed in said annular members, and said annular members having openings formed therein in registration with each other for the accommodation of locking pins for permitting the removal of a section from said inner member.

5. A vehicle tire comprising an outer metallic annular member, having a plurality of openings formed therein, and threaded for the reception of the threaded end of a bolt; an inner sectional annular metallic member associated with said outer member, each section being provided with a plurality of openings formed therein, each opening being in registration with an opening formed in the outer member for permitting the projection of a bolt through said registering openings, for permitting the binding of said inner member circumferentially of said outer member during the removal of a section from said inner member; and resilient means for maintaining said annular members in spaced relation normally.

6. A vehicle tire comprising an outer metallic annular member, having a plurality of openings formed therein, and threaded for the reception of the threaded end of a bolt; an inner sectional annular metallic member associated with said outer member, each section being provided with an opening in registration with one of said openings in said outer member, for permitting the projection of a bolt through said registering openings; resilient means for normally maintaining said members in spaced relation; and an enlargement formed on each of said sections and provided with an opening for affording means for connecting said inner annular member to a vehicle rim with which used.

In testimony whereof we have hereunto set our hands at Onaway, in the county of Presque Isle, in the State of Michigan.

JOHN J. ZELLER.
JOHN J. ZELLER, Jr.